UNITED STATES PATENT OFFICE.

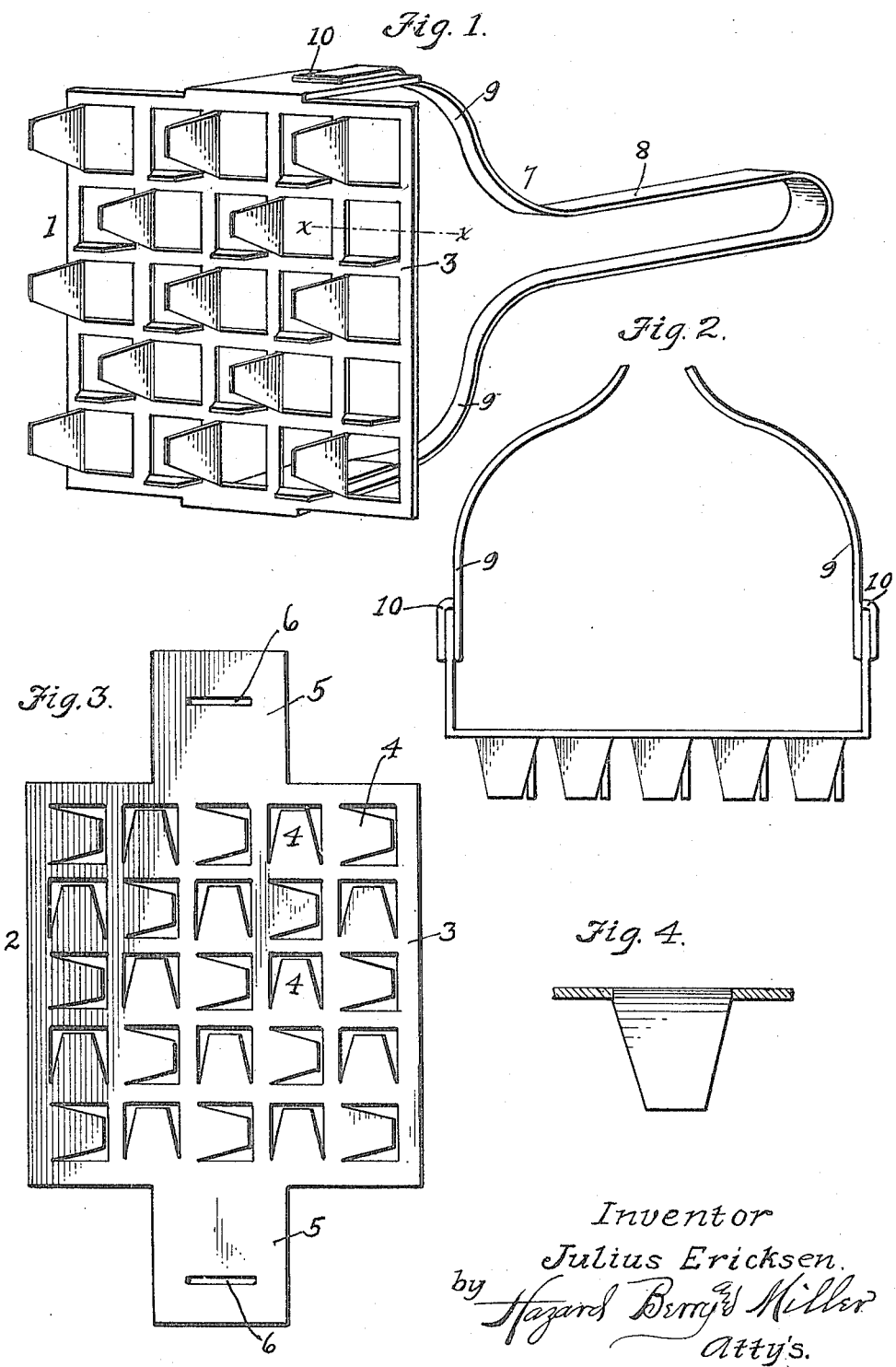

JULIUS ERICKSEN, OF LOS ANGELES, CALIFORNIA.

MEAT-CHOPPER.

1,202,496.

Specification of Letters Patent.

Patented Oct. 24, 1916.

Application filed April 26, 1916. Serial No. 93,796.

*To all whom it may concern:*

Be it known that I, JULIUS ERICKSEN, a subject of the King of Norway, residing at Los Angeles, in the county of Los Angeles and State of California, have invented new and useful Improvements in Meat-Choppers, of which the following is a specification.

This invention relates to meat chopping devices.

It is an object of the invention to provide a meat chopper which may be stamped out of sheet metal and which may be manufactured very cheaply.

It is another object of the invention to provide a meat chopper with chopping blades arranged at an angle to each other so that it will not be necessary to turn the chopper around to chop the meat in different directions.

My invention is illustrated in the accompanying drawing which forms part of this specification, in which:

Figure 1 is a perspective view of the chopper. Fig. 2 is a side elevation of the chopper with the handle partly broken away. Fig. 3 is a plan view of the blank cut from sheet metal from which the blade member of the chopper is formed. Fig. 4 is a detail sectional view taken on line $x$—$x$ of Fig. 1.

In the drawing, 1 indicates a blade member which may be formed from the blank 2 shown in Fig. 3. The blank may be cut from sheet metal in a single piece in the form of a square body portion 3, blades 4 integral with said body and arranged preferably at right angles to each other, and arms 5 extending from opposite sides of said body and provided with transverse slots 6. In the formation of the blade member 1, the blades 4 are bent downwardly from the body at right angles thereto and the arms 5 are bent upwardly at right angles to the body. A handle 7 is formed preferably from a single strip of sheet metal and is bent in the center in the form of an elongated loop 8 which forms the gripping portion of the handle, and outwardly in the form of arms 9, the ends 10 of which are inserted through the slots 6 and bent upwardly around the upper edge of the arms 5 whereby the handle is secured to the blade member.

In operation, a piece of meat is laid out upon a flat surface; the operator grasps the handle portion 8 and swings the chopper up and down over the meat so that the blades 4 cut up the meat into fine particles. In chopping the meat it is unnecessary to turn the chopper around to cut the meat in different directions inasmuch as the cutting edges of the blades are arranged at an angle to each other.

I claim:

1. A meat chopper stamped out of a single piece of sheet metal comprising a body portion having a plurality of parallel rows of cutting blades extending vertically therefrom, said blades being tapered and provided with straight cutting edges, each pair of adjacent blades in said rows being bent at right angles to each other.

2. A meat chopper comprising a cutting member stamped out of a single piece of sheet metal, said cutting member consisting of a body portion having a plurality of parallel rows of cutting blades extending vertically therefrom, said blades being tapered and provided with straight cutting edges, the cutting edges of one set of said blades extending in one direction and the cutting edges of the remaining set of blades extending in a direction at right angles to said first set.

3. A meat chopper comprising a cutting member stamped out of a single piece of sheet metal, said cutting member consisting of a body portion having a plurality of cutting blades extending vertically therefrom and provided with straight cutting edges, the cutting edges of one set of said blades extending in one direction and the cutting edges of another set of blades extending in a direction at right angles to said first set.

In testimony whereof I have signed my name to this specification.

JULIUS ERICKSEN.